(12) United States Patent
Rabadi et al.

(10) Patent No.: US 6,227,101 B1
(45) Date of Patent: May 8, 2001

(54) COFFEEMAKER WITH AUTOMATED INTERLOCKS

(76) Inventors: Masoud Rabadi, 18630 Dearborn St., Northridge, CA (US) 91324; Yong S. Chu, Fitness Botics, 16129 Leadwell St., Van Nuys, CA (US) 91406; Won Lee, 1160 N. Kenilworth Ave., #9A, Glendale, CA (US) 91202

( * ) Notice: Subject to any disclaimer, the term of this patent is extended or adjusted under 35 U.S.C. 154(b) by 0 days.

(21) Appl. No.: 09/576,653

(22) Filed: May 22, 2000

Related U.S. Application Data

(60) Provisional application No. 60/170,035, filed on Dec. 10, 1999.

(51) Int. Cl.[7] .................................................. A47J 31/00
(52) U.S. Cl. ................................ 99/280; 99/279; 99/290; 99/295; 99/304; 99/323.3
(58) Field of Search ............................. 99/279, 275, 290, 99/295, 300, 304, 305, 306, 307, 289 R, 302 R, 323.3, 280

(56) References Cited

U.S. PATENT DOCUMENTS

| | | | |
|---|---|---|---|
| 3,181,732 | * 5/1965 | Immermann et al. | 99/289 R X |
| 4,949,627 | * 8/1990 | Nordskog | 99/281 |
| 5,375,508 | 12/1994 | Knepler et al. | 99/280 |
| 5,676,040 | 10/1997 | Ford | 99/280 |
| 5,704,275 | 1/1998 | Warne | 99/281 |
| 5,713,214 | 2/1998 | Ugolini | 62/188 |
| 5,738,001 | 4/1998 | Liverani | 99/283 |
| 5,896,806 | 4/1999 | Dal Tio | 99/289 T |
| 5,953,981 | 9/1999 | Lassota | 99/281 |
| 5,975,348 | 11/1999 | Rudewicz et al. | 221/150 R |
| 6,047,630 | * 4/2000 | Brown et al. | 99/279 |
| 6,050,175 | * 4/2000 | Mirand et al. | 99/279 |

FOREIGN PATENT DOCUMENTS

WO9923888   5/1999  (WO) .

* cited by examiner

Primary Examiner—Reginald L. Alexander
(74) Attorney, Agent, or Firm—Gene Scott-Patent Law & Venture Group

(57) ABSTRACT

An apparatus for preparing coffee comprises a chassis engaging an electronic power and control circuit, a water heater, a coffee brewing tray adapted for receiving a coffee packet, a coffee pot supporting shelf, a control panel adapted for receiving manual selections for operating the apparatus, an electrical interlock adapted for sensing the presence of a coffee pot on the coffee pot supporting shelf. An electrical interlocking scheme is adapted for sensing when the coffee pot is present and when it is full, the temperature and level of water in the water heater, and when a restraining handle is in place.

6 Claims, 9 Drawing Sheets

COFFEEMAKER WITH AUTOMATED INTERLOCKS

The present application claims the priority date of a previously filed provisional patent application having Ser. No. 60/170,035 and an assigned filing date of Dec. 10, 1999 and which contains subject matter substantially the same as that described and claimed in the present application.

BACKGROUND OF THE INVENTION

1. Field of the Invention

This invention relates generally to an apparatus for preparing beverages, and, more particularly, to a coffee maker that includes interlocks to assure automated operation, safety, quick maintenance and reliability of operation.

2. Description of Related Art

The following art defines the present state of this field:

Dal Tio, U.S. Pat. No. 5,896,806 describes a machine for preparing coffee, white coffee or similar infused beverages, on single or multiple doses thereof, utilizes waffles (40) packed in advance, applied in a continuous band (41), in a number sufficient to prepare various coffees or other infused beverages. The machine has guide and feeding device (43) associated to the infusion units (35), (36) and the filters (97), (98) thereof, to determine the advancement of the band (41) through the infusion units (35), (36), by stopping each waffle in correspondence thereto for performing the related infusion operation. The machine may contain also a mixer-emulsifier (52) with conduits (105) communicating or not communicating with the infusion units (35), (36) through a switching valve member (106), for preparing the white coffee or other infused beverages mixed with milk.

Knepler, et al. U.S. Pat. No. 5,375,508 describes a control system for a beverage brewing apparatus that includes a programmable control module and a separate input device. The control system is used with a beverage brewing apparatus of the type having an infusion assembly for retaining and filtering a brewing substance, a heated water source and a water distribution system for transporting water from the heated water source to the infusion assembly. The programmable control module controls numerous adjustable functions associated with the brewer and stores at least one function limit for each of the functions that it controls. The separate input device is selectively attachable to the control module for manipulating the function limits of the programmable function retained and controlled by the control module. Function controls are associated with the input device for selecting a function to manipulate and for incrementing and decrementing the limit or limits of the selected function. The control module and input device allow selection of control limits that affect a valve for controlling water flow from the heated water source to the infusion assembly. These control limits establish a dispensing cycle that periodically dispenses water from the heated water source through the water distribution system to the infusion assembly to prevent overflowing the infusion assembly.

Rudewicz, et al. U.S. Pat. No. 5,975,348 describes a vending machine includes a number of failure control devices that monitor and control the functioning of the various components in the vending machine to ensure uniform quality of food products to be sold to a customer. One specific embodiment includes plurality of oven failure control devices, a freezer failure control device and a power failure control device. When a microcontroller in the vending machine determines the occurrence of a failure, the microcontroller displays a failure message on a customer display and discontinues vending food until the failure is corrected, for example, by an operator. In another aspect of this invention, the vending machine includes a mechanism for operating a door of a refrigeration compartment of the vending machine. The mechanism includes a motor driven rotary link coupled to a roller that moves in a slot of the door.

Lassota, U.S. Pat. No. 5,953,981 describes a twin brewer system (30) with a pair of brewers (30A, 30B) each with a controller (158) for controlling the application of electrical power to a hot water heater, disables the application of electrical power to the heater (154) of one brewer (30A, 30B) in response to actuation of a start brew switch of the one brewer (30A, 30B) while electrical power is being applied to the heater (154) of the other brewer (30A, 30B). The controllers also respond to a hot water quantity sensor (164, 168) and a responsive delay circuit for disabling dispensing of hot water in response to actuation of the brew start switch (50) until a sufficient quantity of hot water is in a hot water dispenser tank (152) needed for the brew cycle. Indication lo lamps indicate when the brew cycle is being delayed and when brewing is not being performed.

Actuation of a single emergency stop switch (138) stops hot water dispensing of both brewers (30A, 30B).

Warne, U.S. Pat. No. 5,704,275 describes a control system for a coffee brewer having a microprocessor in which the water heated in the heater tank must be a predetermined temperature before brewing. A double brewing cycle is prevented. Upon the system not being activated for a period of time, i.e., the water temperature is allowed to drop a greater magnitude for energy saving and component protection.

Ugolini, U.S. Pat. No. 5,713,214 a machine for cooling and dispensing a product substantially behaving like a fluid, such as beverages or water-ice, comprises a base (11) and a tank (12) for treatment of the product to be dispensed. The tank is positioned on the base in a removable manner and heat exchange means (14) and a powered stirring element (15) are inserted thereinto. Also arranged in the tank (12) is a level probe (19) connected with control means (25) of the product level in the tank. The probe (19) has one detecting end (20) within the tank and an electrical-contact area (23) disposed on an external wall of the tank (12). Additionally, the base (11) bears an electricalcontact element (24) connected to the control means (25). On mounting of the tank (12) on the base (11), the contact area (23) of the probe (19) comes into electrical contact with the contact element (24) on the base so that the probe (19) is automatically connected in a detachable manner to the control means (25). Further means (43) disables a filling-up action controlled by the level sensor, in case of lack or improper positioning of the sensor and/or the tank.

Ford, U.S. Pat. No. 5,676,040 describes a sensing assembly that includes a sensing device. The sensor assembly is constructed for use with an automatic beverage apparatus. The sensing assembly is attached to a beverage reservoir and senses, by physical contact, a quantity of beverage retained in the reservoir. The sensing assembly provides information about the quantity of beverage retained in the reservoir. When coupled to a beverage brewing apparatus, the beverage brewing apparatus will automatically produce a predetermined quantity of beverage in response to conditions sensed by said sensing assembly.

Allington, et. al. WO 99/23888 describes an apparatus and method of roasting foodstuff such as coffee beans employ a roasting chamber for roasting the beans. An air circulation system operatively coupled with the chamber flows heated air over the beans and thereby roasts the beans, and an air cleaning arrangement is operatively coupled with the air circulation system and located downstream of the chamber for removing substantially all particulates, smoke and volatiles entrained in the used air as it flows through the container and into the air cleaning arrangement to provide substantially pollutant-free used air. The circulation system uses atmospheric air and heats, cleans and cools within as little as ¼second. Sensors and an electronic controller are provided to monitor various parameters in the roasting apparatus and control the roasting characteristics. The darkness or color of the beans during roasting in roasting machines at a plurality of geographically separate locations is controlled by equipping each roasting machine with a computer with memory and providing a central control station for downloading control signals to the computer to control roasting.

Liverani, U.S. Pat. No. 5,738,001 teaches a control device which processes simultaneously, the signals received from a temperature sensor, and from a water delivery counter means, to control, instant by instant, the pump delivery and the electricity feeding the machine heat exchanger, so as to maintain a reference temperature of the water exiting the heat exchanger.

The prior art teaches a range of coffee making devices with various capabilities including automation features and controls. However, the prior art does not teach the safeguards and interlocked controls of the instant invention, and especially a coffee making apparatus particularly designed for airline use wherein a coffee pot is pinned in place and a coffee making process fully interlocked for automated safe operation and having modular construction for improved diagnostics based maintenance.

The present invention fulfills these needs and provides further related advantages as described in the following summary.

SUMMARY OF THE INVENTION

The present invention teaches certain benefits in construction and use that give rise to the objectives described below.

The present invention is an apparatus for preparing coffee designed for use in airplanes or other vehicles subject to movement. The apparatus comprises a supporting shelf for supporting a coffee pot; a coffee brewing tray adapted for receiving a coffee packet; a chassis engaging an electronic power and control circuit; and a water heater, among other components. An electrical interlock is adapted for sensing the presence of the coffee pot on the coffee pot supporting shelf and provides a physical restraint for ensuring that the coffee pot cannot be dislodged during aircraft movements. The electronic power and control circuit includes interlocks for sensing when the coffee pot is full and the water level in the water heater. A control panel provides manual selection of operational modes and control of the coffee brewing process. The apparatus includes several other advanced features, such as diagnostic circuitry, easily changed components and modules and adjustable flow control. Locking mechanisms are provides for securing the filter tray as well as for locking the system chassis securely in place on a rail-support assembly.

The apparatus also provides a warmer pad that turns on when the brewing cycle is initiated and its temperature is factory set according to customer requirement.

A primary objective of the apparatus is to provide a coffee-preparing apparatus having advantages not taught by the prior art.

Another objective of the apparatus is to provide a means for securing the apparatus against movement of the aircraft.

A further objective is to provide such an apparatus with subassembly components contained in modular form so that they are easily replaceable for maintenance purposes.

A still further objective is to provide such an apparatus containing a sensor within the coffee pot component itself which causes a circuit to stop delivering coffee when the coffee pot is full.

A still further objective is to provide such an apparatus with an electrical interlock so as to prevent the delivery of coffee when the coffeepot is not in place on a coffee pot supporting shelf.

A still further objective is to provide such an apparatus with a pot restraining handle electrically interlocked with machine operation.

A still further objective is to provide such an apparatus with a rail system adapted for supporting the apparatus, the apparatus adapted for sliding engagement with the rail system; and a locking means for removably engaging the apparatus with the rail system.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
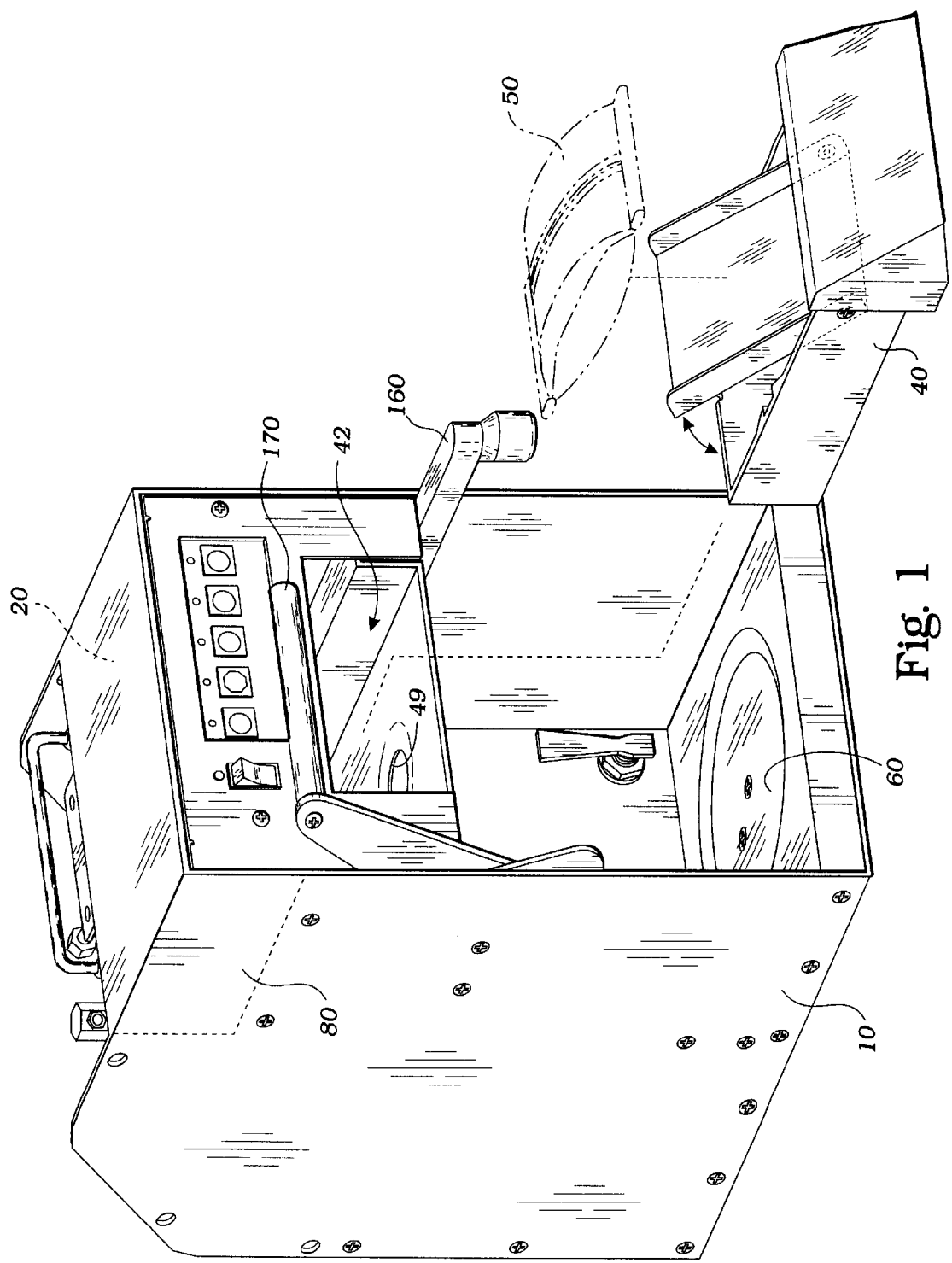
FIGS. 1 and 2 are front perspective views of the preferred embodiment of the present invention.

The above described drawing FIGS. 1–11 illustrate the invention, most specifically, a coffee maker for airline use. The apparatus comprises a chassis 10 engaging with, and enclosing: (a) an electronic power and control circuit 20, a plug-in module comprising and interconnected with certain electrical elements, as shown generally in FIG. 9; (b) a water heater 30 including a water canister 32 and its electrical heaters 34, sensors, etc.; (c) a coffee brewing tray 40 (FIGS. 1 & 2), adapted, as will be described below, for receiving a commercially available coffee packet 50 (not a part of the instant invention); (d) a coffee pot supporting shelf 60, located at the front of the chassis 10, as seen in FIGS. 1–4; and (e) a coffee pot 70 (FIGS. 4 & 5) adapted for resting on the coffee pot supporting shelf 60 in a position below the coffee brewing tray 40 and accessible for insertion and removal from the supporting shelf 60 by flight attendants or others.

Figure 6:
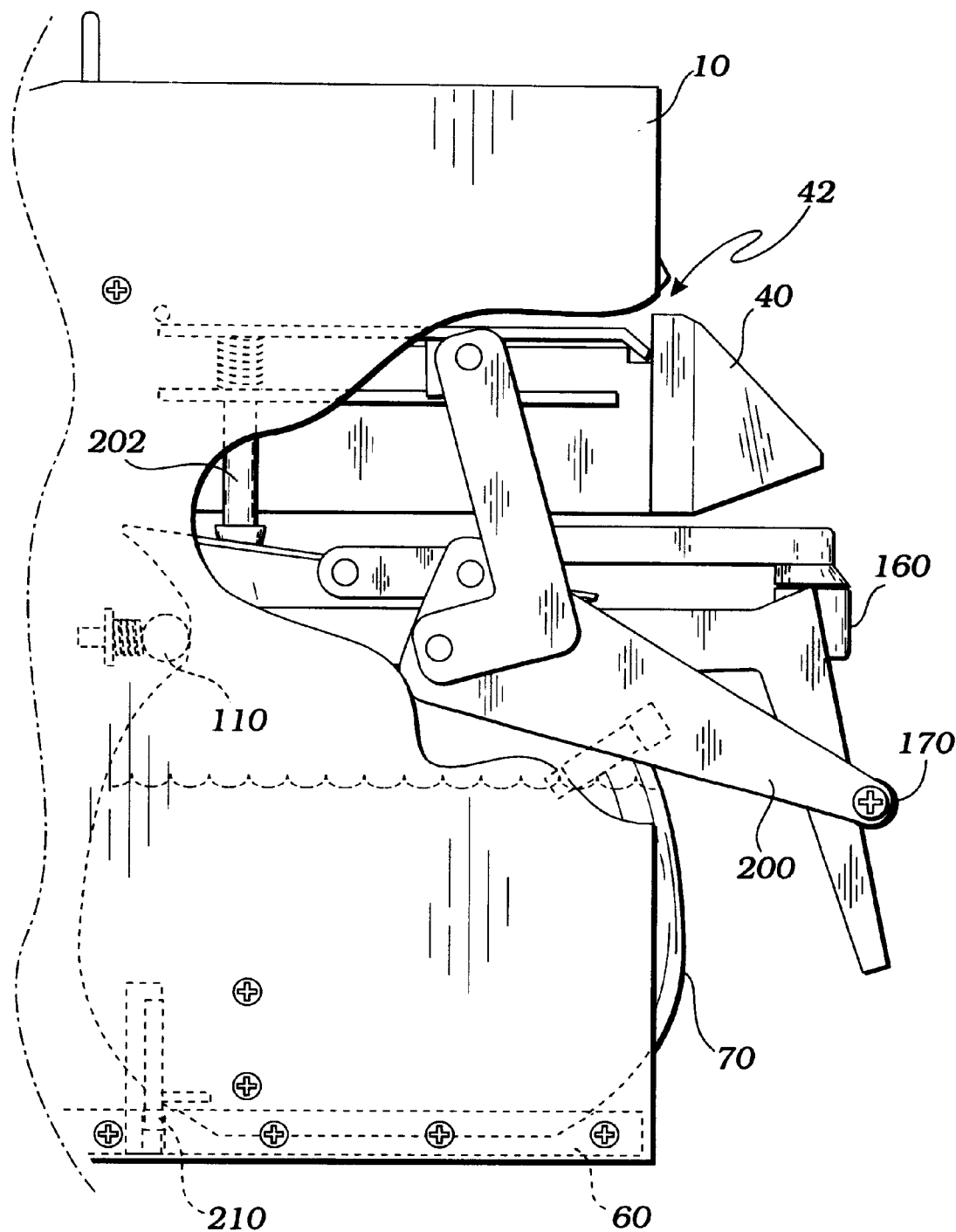

Preferably, the power and control circuit 20 is enclosed within a modular housing 80, the modular housing being adapted for plug-in connection with the chassis 10 so that it is easily replaceable should a failure occur. The chassis 10 further comprises a control panel 90, located at the front of the modular housing 80 (front panel) and adapted with switches 91–96 for receiving manual selections for operating the apparatus. Below the control panel 90 is a tray access port 42 for receiving the coffee brewing tray 40 in sliding engagement. A tray locking means 44, a pivoted sheet metal partition, is positioned and enabled for moving downwardly into a locking position, as shown in FIG. 6, for engaging the tray 40 so that it cannot be removed from the front panel when the apparatus is in operation. This locking function is accomplished by handle 170 which also bars removal of the coffee pot 70 when in the extended (down) position as best seen in FIG. 6.

Figure 5:
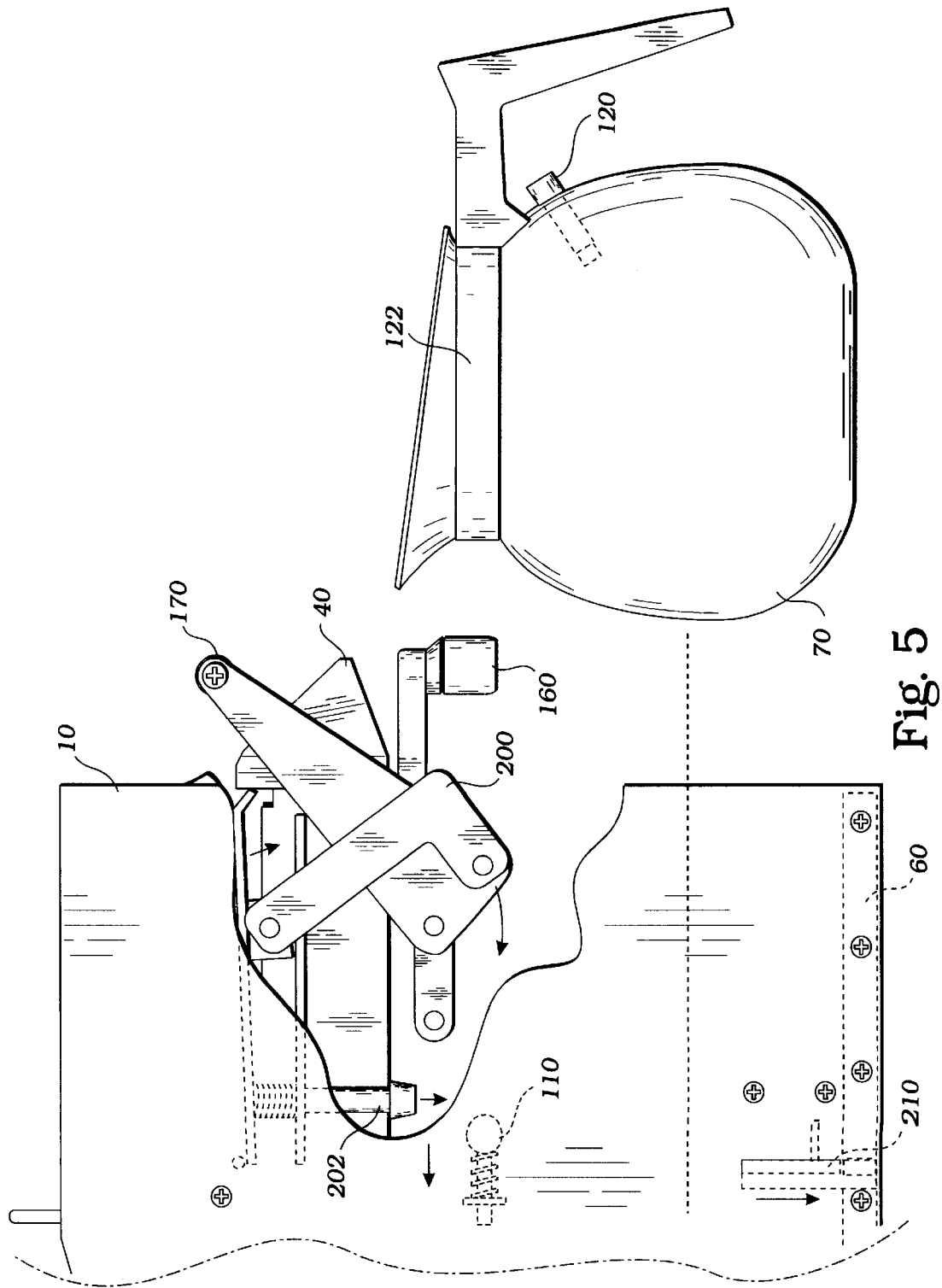
FIGS. 5 and 6 are partial left side elevational views thereof with partial cutaway.

Critical to the novelty of the instant invention are certain interlocks providing controlled automated and safe use of the apparatus, a primary concern. Referring now to FIGS. 5 and 6, a first electrical interlock 110 is a switch adapted for sensing the presence of the coffee pot 70 on the coffee pot supporting shelf 60; the coffee pot 70 pressing against this switch when the pot 70 is properly positioned on the shelf 60. The control circuit 20 prohibits brewing operations when interlock 110 is not made. A second electrical interlock 120 is a probe adapted for sensing when the coffee pot is filled to an appropriate level (full). This is accomplished when the water or coffee liquid level reaches the interlock 120 and thus grounds a circuit by electrical conduction through the liquid to the pot and thus to the chassis 10. Note that conducting band 122 positioned on, and insulated from pot 70 is electrically interconnected with probe 120 and touches switch 110 to complete the circuit when the pot 70 is in place. A third electrical interlock 130 is adapted by use of thermistors located in the water heater canister 32 for sensing the temperature of water therein and for controlling the heating process to a set temperature. A hot water level sensing means 140, a float, senses the water level in the water heater canister 32 and is interlocked to the circuit 20 wherein a selected water volume must be present for operation.

Figure 7:
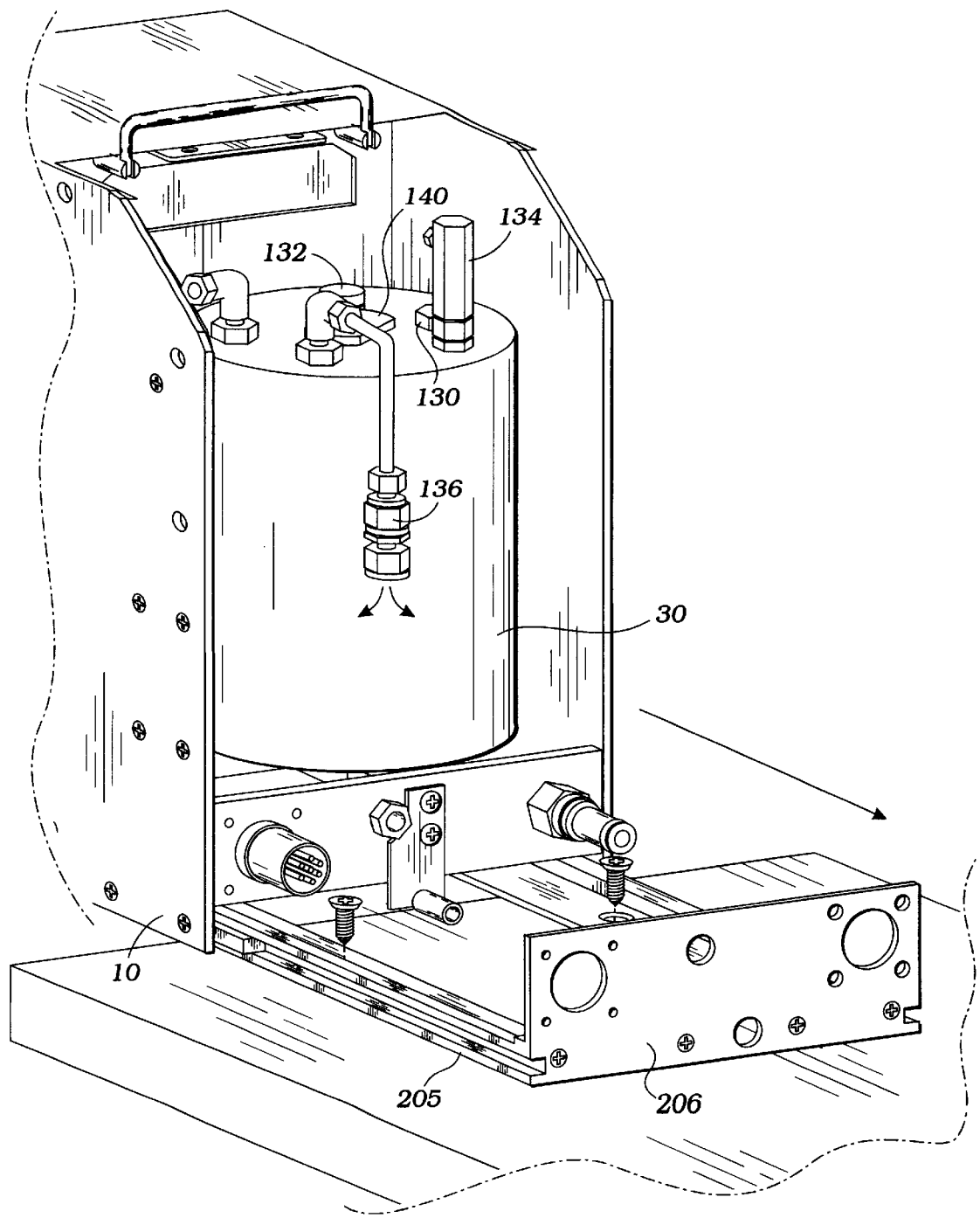
FIGS. 7 and 8 are rear perspective views thereof.
Figure 8:
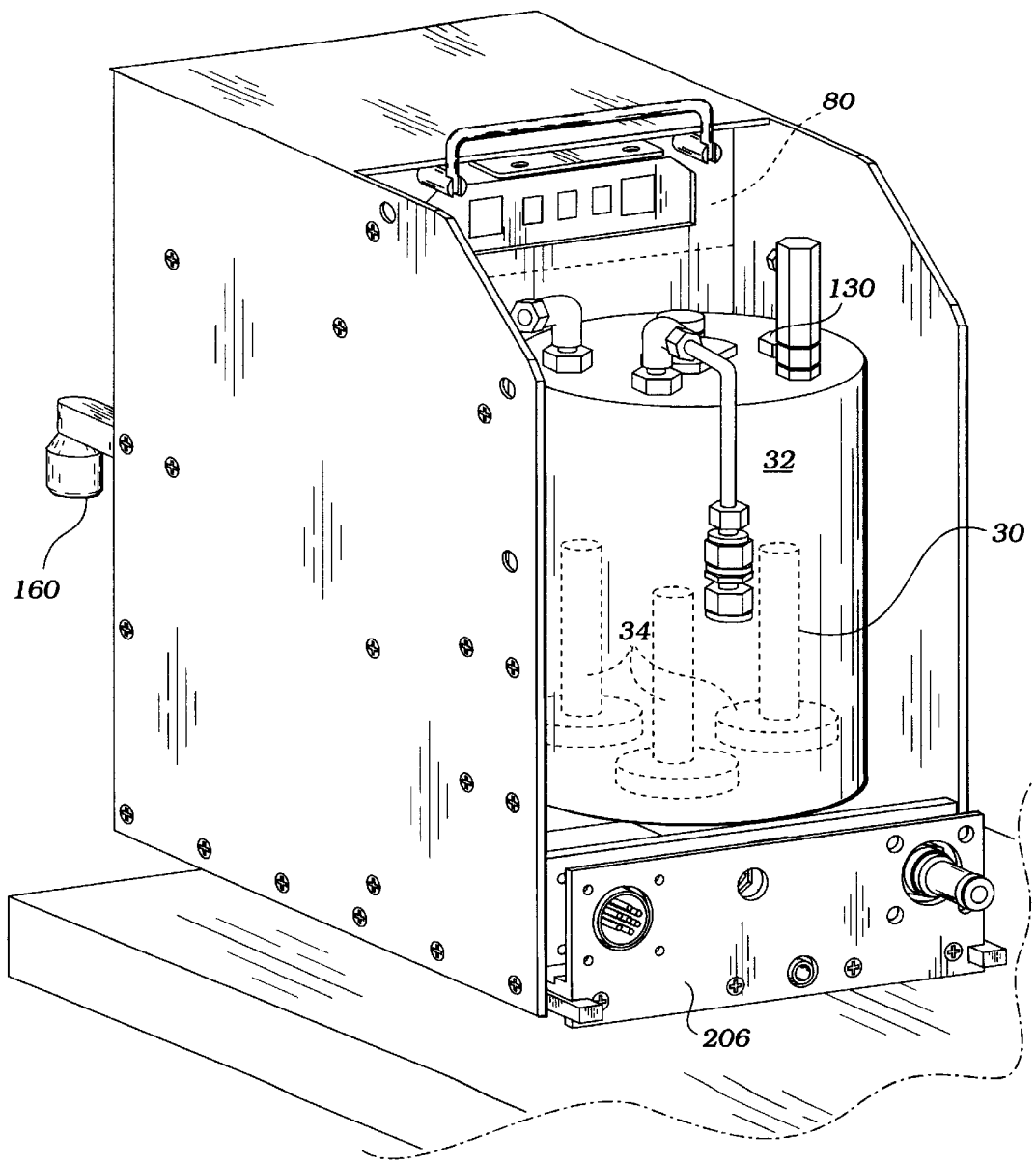
Figures 9, 10:
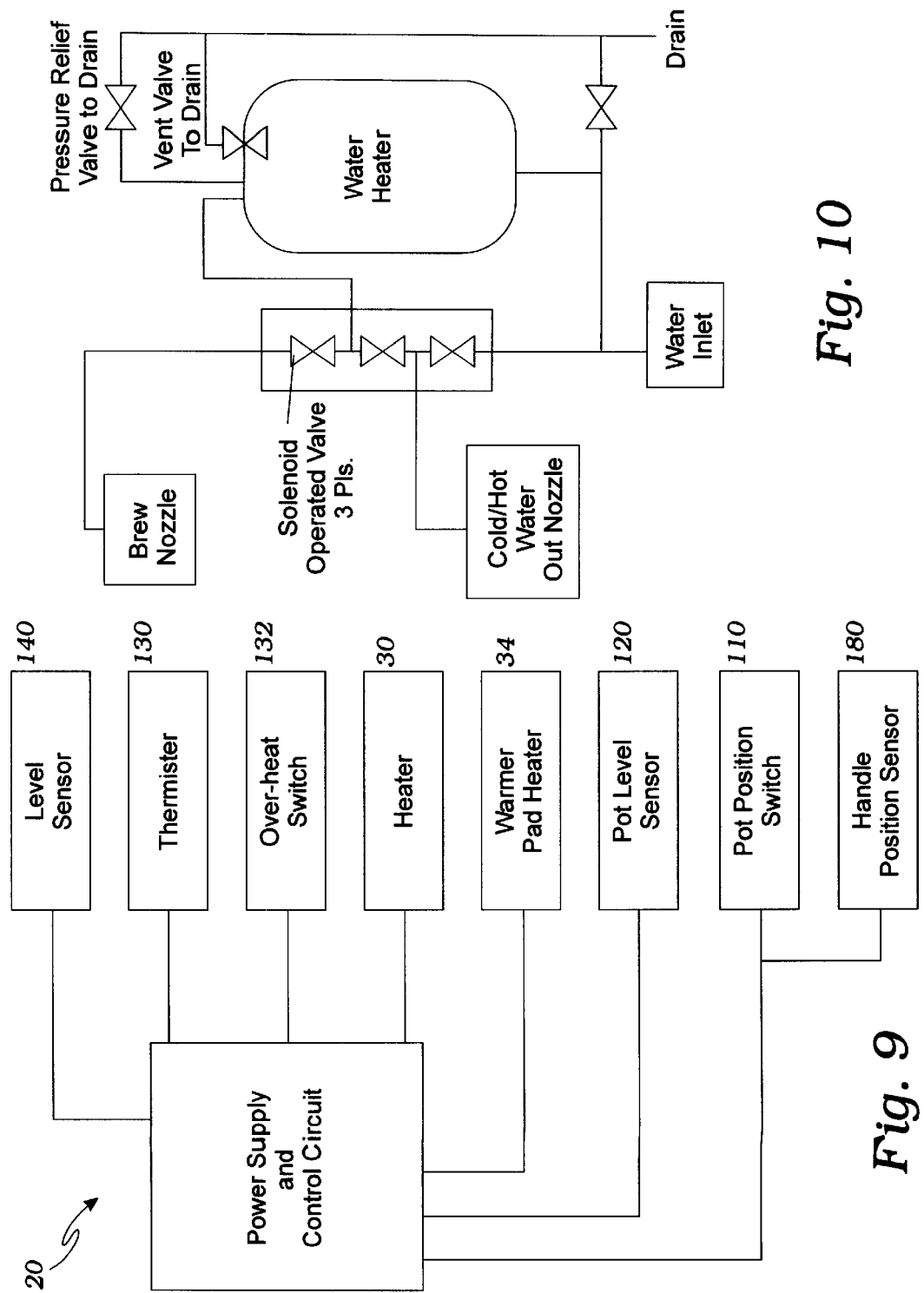
FIG. 9 is a block diagram of certain electrical circuit elements thereof.
FIG. 10 is a block diagram of a water heater system thereof.

Preferably, the apparatus further comprises a faucet 160 extending outwardly from the front of the apparatus (FIG. 1) and adapted by water circuit interconnection, shown in FIG. 10, for dispensing hot and cold water on demand. Water inlet and drain connections are made when the chassis 10 is fully engaged with the rail system as shown in FIG. 8. In FIGS. 7 and 8, the receiving fixtures and hardware that are mounted in the rail system bracket 206 are not shown for clarity.

Figure 2:
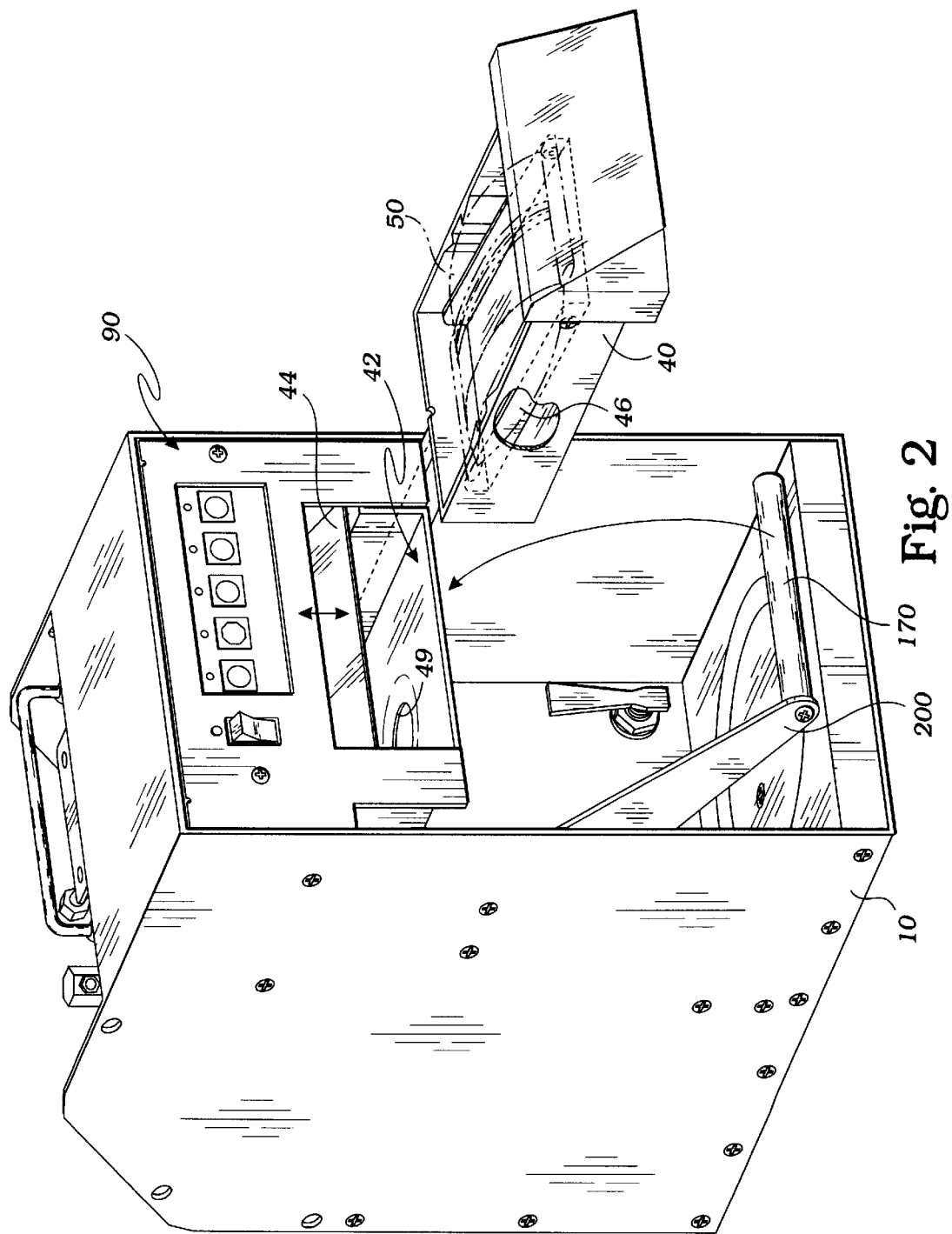
Figure 4:
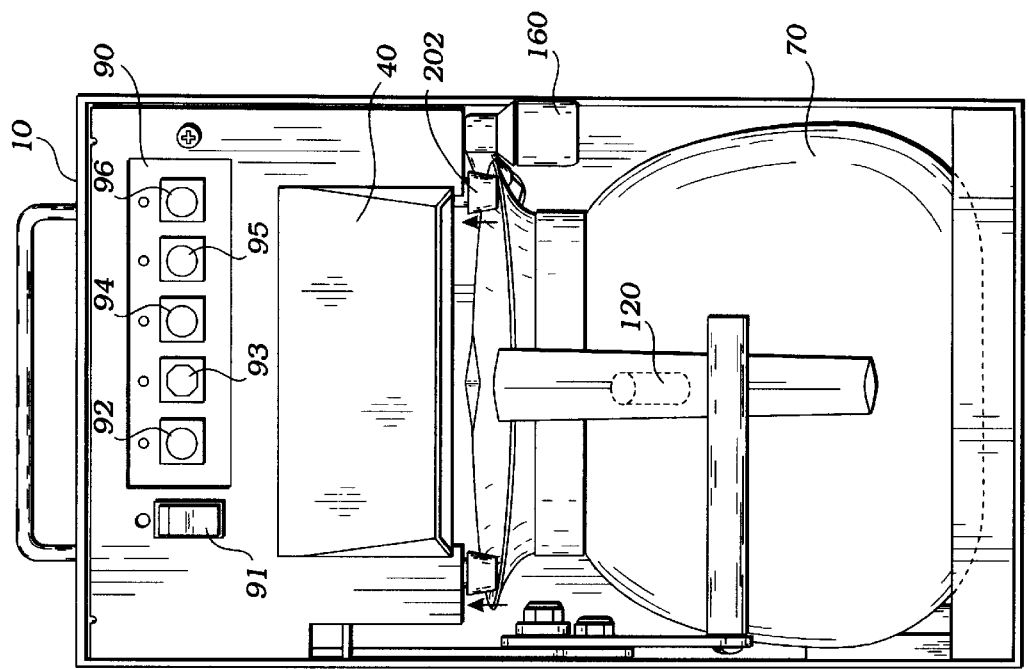
FIGS. 3 and 4 are front elevational views thereof.
Figure 3:
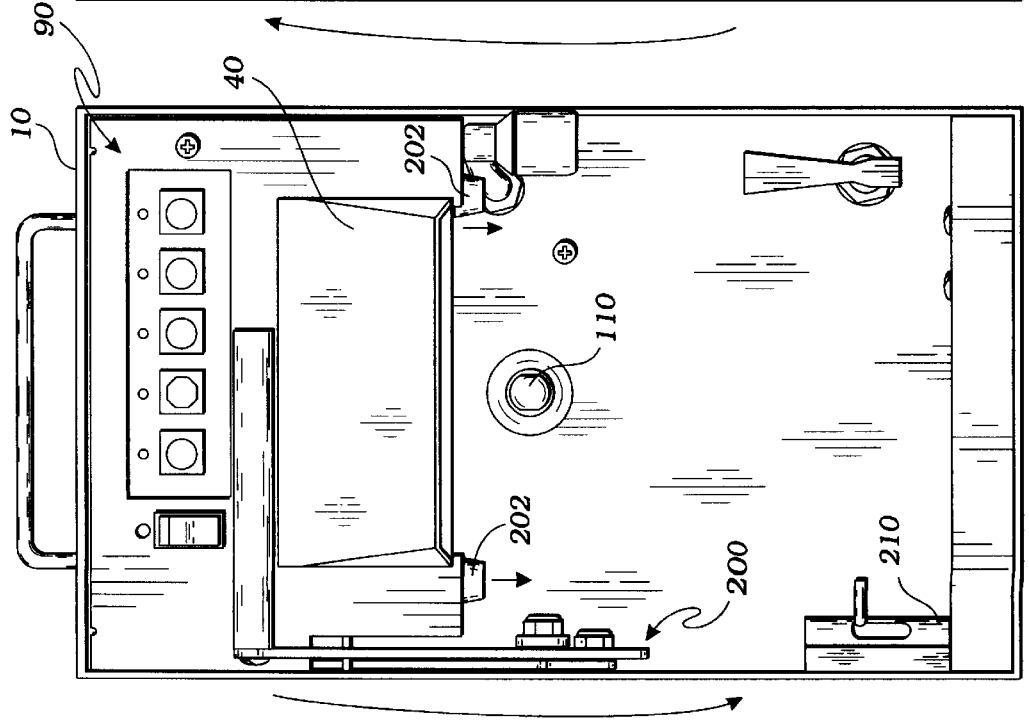

Inventively, the apparatus further comprises a movable coffee pot restraining means or handle 170 for restraining the coffee pot 70 on the coffee pot supporting shelf 60. This restraining handle 170 is positionable in a retracted (or up) position, as shown in FIGS. 1, 3 and 5 and alternately, in an extended (or down) position as shown in FIGS. 2, 4 and 6 wherein the coffee pot cannot be physically removed or be forced out of its position in the chassis 10 due to inertial or other forces. The restraining handle 170 must be in the down and locked position for the brewing process to take place. A pair of spaced apart fingers 202, as shown in FIGS. 3–6, are enabled by the mechanism 200, driven by the restraining handle 170, for engaging the rim of the coffee pot 70 when the restraining handle 170 is in the extended position. This is best seen in FIGS. 5 and 6. An electrical interlock 180 is interconnected with the mechanism 200 for preventing the brewing process from starting, if the restraining handle 170 is not down. Therefore, coffee brewing is not able to start until the coffee pot is in place, the handle is down and locked and the liquid level within the coffee pot, if any, is below the defined full level.

Figure 11:
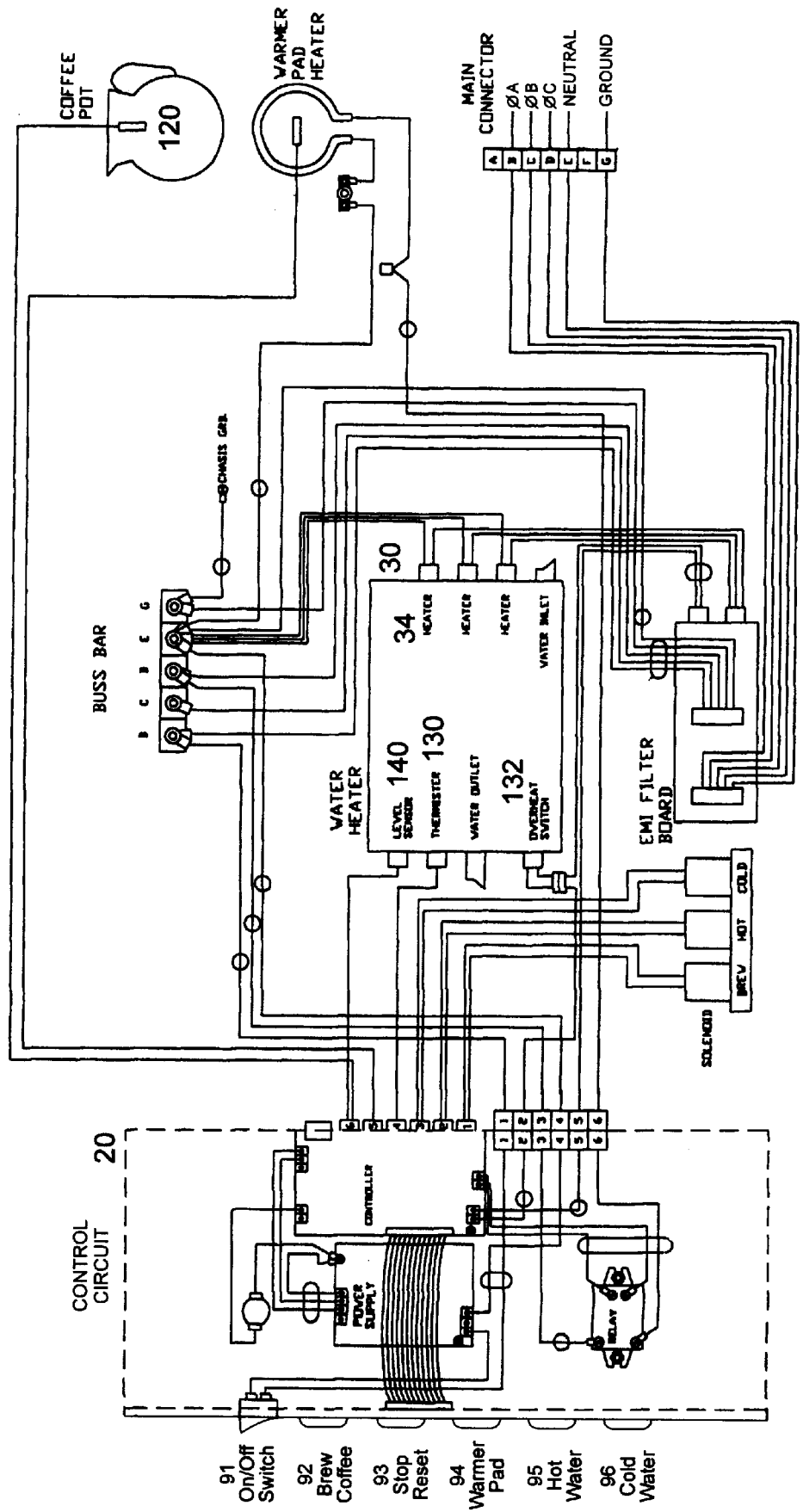
FIG. 11 is a wiring diagram showing placement of major components thereof.

Inventively, the water heater 30 comprises an over-temperature sensing means 130 as shown in FIG. 7, preferably a pair of thermisters positioned within the water heater 30 for redundant assurance that an over-temperature condition in the water heater 30 will not go unnoticed. These sensors communicate with the power and control circuit 20, as shown in FIGS. 9 and 11, and are configured so that the heaters 34 are automatically shut down should an over-temperature condition occurs. A relief valve 36 provides for pressure relief should pressure in the water heater exceed 100 psi. The level sensor 140 (float), a vent 134 for draining the water heater, and an over temperature switch 132 in the water heater 30 are illustrated in FIG. 7.

Inventively, the apparatus further comprises a rail system 205 adapted for engaging and supporting the chassis 10 in place in an airline kitchen or similar location. The chassis 10 is adapted for sliding engagement with the rail system, as shown in FIG. 7. Preferably, the chassis 10 may be locked in place on the rail system 205 by a locking means 210, shown in FIGS. 3 (unlocked) and 5 (locked). Locking means 210 is preferably a bolt-action type lock with a spring loaded sliding pin which engages a hole in the rail system. Unless this lock is placed manually in a withdrawn (up) position, the spring forces the sliding pin to engage the rail system 205. Therefore, the rail system and the chassis are engaged by default. The chassis is thus proactively prevented from being displaced from its operational position on the rail system where its utilities are engaged.

In operation, the coffee pot 70 is placed onto coffee brewing tray 40 and tray locking means 44 is moved to the down and locked position. Hot water is prepared to a selected temperature in water heater 30 and is then delivered, upon command, to drip onto the coffee packet 50 from above. The hot water percolates through the coffee packet so as to brew into coffee which then runs off a stainless steel coffee packet support 46, upon which the coffee packet 50 rests, and downwardly through a coffee access hole (not shown) in brewing tray 40, through a shelf access hole 49 and into coffee pot 70. When the pot has filled, as indicated by the second electrical interlock 120, filling stops and a ready light is illuminated. The coffee packet 50 may now be discarded by raising locking means 44 via handle 170 which allows the coffee packet tray to be removed. With handle 170 in the raised position, the coffee pot 70 is able to be removed from the apparatus for service.

While the invention has been described with reference to at least one preferred embodiment, it is to be clearly understood by those skilled in the art that the invention is not limited thereto.

Rather, the scope of the invention is to be interpreted only in conjunction with the appended claims.

What is claimed is:

1. An apparatus for preparing coffee, the apparatus comprising:
   a chassis engaging an electronic power and control circuit, a water heater, a removable coffee brewing tray adapted for receiving a coffee packet, and a coffee pot supporting shelf;
   a coffee pot adapted for resting on the coffee pot supporting shelf in a position below the coffee brewing tray; and
   interconnected with the electronic power and control circuit:

a control panel adapted for receiving manual selections for operating the apparatus;

an electrical interlock adapted for sensing presence of the coffee pot on the coffee pot supporting shelf;

an electrical interlock adapted for sensing a liquid level in the coffee pot;

an electrical interlock adapted for sensing the temperature of water in the water heater;

and a mechanical interlock for locking the coffee brewing tray and the coffee pot in place during operation of the apparatus.

2. The apparatus of claim 1 further comprising a faucet adapted for dispensing hot and cold water.

3. The apparatus of claim 1 further comprising a means for sensing an over-temperature condition in the water heater.

4. The apparatus of claim 1 further comprising a rail system adapted for supporting the apparatus, the apparatus adapted for sliding engagement with the rail system.

5. The apparatus of claim 4 further comprising a locking means for removably engaging the apparatus with the rail system.

6. The apparatus of claim 1 wherein the power and control circuit is supported within a modular housing, the housing adapted for plug-in connection with the chassis.

* * * * *